US009278810B2

(12) United States Patent
Meyer et al.

(10) Patent No.: US 9,278,810 B2
(45) Date of Patent: Mar. 8, 2016

(54) FRAME FOR A CONVEYOR BELT SYSTEM

(71) Applicant: Mettler-Toledo Garvens GmbH, Giesen (DE)

(72) Inventors: Mario Meyer, Langenhagen (DE); Dirk Bettels, Harsum (DE); Axel Preussner, Hildesheim (DE); Michael Kusche, Hildesheim (DE); Frank Hamann, Giesen (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 0 days.

(21) Appl. No.: 14/519,447

(22) Filed: Oct. 21, 2014

(65) Prior Publication Data

US 2015/0114803 A1    Apr. 30, 2015

(30) Foreign Application Priority Data

Oct. 25, 2013  (EP) .................................... 13190277

(51) Int. Cl.
*B65G 21/06* (2006.01)
*B65G 41/00* (2006.01)
*B65G 15/60* (2006.01)

(52) U.S. Cl.
CPC ................ *B65G 21/06* (2013.01); *B65G 15/60* (2013.01); *B65G 41/006* (2013.01)

(58) Field of Classification Search
CPC ........ B65G 21/00; B65G 21/02; B65G 21/06; B65G 41/00; B65G 41/006; B65G 15/60; B65G 2207/30
See application file for complete search history.

(56) References Cited

U.S. PATENT DOCUMENTS

| 3,869,007 | A  | * | 3/1975  | Haggstrom | .......... G01G 3/1408 177/119 |
| 7,114,615 | B1 | * | 10/2006 | Karpy | .................... B65G 21/20 198/841 |
| 7,307,225 | B2 | * | 12/2007 | Berger | ................... B65G 15/62 177/119 |
| 8,235,203 | B2 | * | 8/2012  | Glisch | .................... B65G 15/00 177/119 |

FOREIGN PATENT DOCUMENTS

| DE | 102007032270 A1 |   | 1/2009 |
| KR | 10-1053716 B1   |   | 8/2011 |
| KR | 101053716 B1    | * | 8/2011 |
| WO | 2011/064088 A1  |   | 6/2011 |

* cited by examiner

*Primary Examiner* — Leslie A Nicholson, III
*Assistant Examiner* — Keith R Campbell
(74) *Attorney, Agent, or Firm* — Standley Law Group LLP (57) ABSTRACT

A frame (1, 101, 201) supports a conveyor belt system with a longitudinally circulating conveyor belt. Two plate-like carrier elements (2, 102), with principal planes extending at right angles to the longitudinal direction (L) are joined by at least two distance elements (4, 4'), disposed parallel to the longitudinal direction (L). The distance elements space the two carrier elements apart. A plurality of support elements (5) and machine feet (21) support the frame on the ground. At least one of the carrier elements defines a seating area (3), which is largely arranged horizontally. At least two first mechanical interface elements (6) run parallel to the distance elements, preferably extending over the carrier elements, and are fixed on the seating areas of the carrier elements. The frame also has at least two fixing elements (7), by which the first mechanical interface elements (6) are fixed to the seating areas.

19 Claims, 4 Drawing Sheets

FRAME FOR A CONVEYOR BELT SYSTEM

CROSS-REFERENCE TO RELATED APPLICATIONS

This application is entitled to benefit of a right of priority under 35 USC §119 from European patent application 13190277.7, filed on 25 Oct. 2013, the content of which is incorporated by reference as if fully recited herein.

TECHNICAL FIELD

The invention relates to a frame for a conveyor belt system, which comprises a conveyor belt circulating in a longitudinal direction for the transport of an object alone, or in combination with an inspection system.

BACKGROUND

In many automated production operations, the products, or other objects, are transported by means of conveyor belt systems. The manufacturer has a large number of inspection systems available for the quality assurance of products, such as for example checkweighers, metal detectors, optical inspection systems, x-ray inspection systems and so forth.

In the production of pharmaceutical or cosmetic products, foodstuffs, beverages and also in the logistics industry, chemical industry, automotive supply industry, and the metal-processing industry, checkweighers are a key element of quality assurance. They improve not only the utilisation of existing resources, but also assist in complying with national regulations, calibration regulations and industrial standards. An effective checkweigher system offers protection against product defects and reduces overall operating costs.

A dynamic checkweigher is a system which weighs products to be weighed while they are conveyed over the scales within the production line, classifies the products to be weighed into predetermined weight zones and sorts or rejects products to be weighed according to the weight classification. Areas in which checkweighers are used are diverse and include for example:

testing for underweight or overweight products;

complying with statutory regulations for the net contents of packaged goods;

reducing product waste by using the weight values obtained by means of the checkweigher to adjust the filling machines;

classifying products according to weight;

measuring and recording the output of production plant or production line; and verifying piece numbers on the basis of the weight.

All of the products of a production line are weighed with checkweighers. The total product data are thus collected for product counting, batch monitoring or for production statistics.

A checkweigher system usually comprises an infeed belt, a weighing belt, an outfeed belt with a sorting arrangement and a weighing terminal with an operator interface. The weighing belt lying between the infeed belt and outfeed belt is mounted on a weighing cell, which detects dynamically the weight of the product as it travels over the weighing belt. The two most frequently used weighing technologies for checkweighers are weighing cells with strain gauges (DMS) or weighing cells operating accordance to the principle of electromagnetic force compensation (EMFR). After their transport over the weighing belt, the products are carried away by an outfeed belt located downstream of the weighing belt. By means of the dynamic weighing, products having the incorrect weight are detected and ejected by a rejection device usually at right angles to the transport of the products taking place in the longitudinal direction.

Just like checkweighers, metal detectors also belong to the key components for effective quality assurance. Metal detectors are used industrially to search for product impurities, for example for lead pellets in meat, pieces of wire in cereals, shavings due to repairs to the production plant or other impurities from the product processing.

An industrial metal detection system is a highly developed device, with which metallic foreign bodies can be detected and separated out. The detection capability includes ferrous metals, also special steels and non-ferrous metals, such as brass, copper, aluminium and lead. A typical metal detection system comprises at least the following four main components: a seeker head, a transport system, an operating unit and an automatic rejection system. The seeker head usually comprises a plurality of electromagnetic coils, which are each used to generate or detect high-frequency electromagnetic fields.

In order that the metal detector is not disturbed by electrical signals from metallic components or machines in close proximity, the seeker head is accommodated in a shielded manner in a metal housing, usually made of steel or aluminium. The metal housing also serves to improve the strength and rigidity and thus has a significant share in the detection performance of the overall metal detector. The products to be examined are passed, in the case of a plurality of metal detectors, through an opening in the metal housing through the coils of the metal detector.

Despite shielding by means of a metal housing, a part of the high-frequency magnetic field exits to the exterior through the metal detector opening and can impair the performance of the metal detector if this magnetic field is then disturbed by metal objects. In order to achieve optimum metal detection, no metal objects must be present in a certain region around the metal detector opening. This region is referred to as a metal-free zone MFZ. This factor should be taken into account for a reliable detection of the products.

Optical inspection systems are capable of detecting products with a defective appearance dynamically during transport. With cameras and/or scanners, they detect a product as a whole and compare the acquired images on the basis of a reference image (bitmap comparison) and/or on the basis of CAD data (vector comparison). If for example a product displays damage or non-uniformity of the packaging and/or labels applied slanting, it can then be rejected following the inspection system. Such an inspection system is provided at the side of and/or above the conveyor belt and can be shielded by a surrounding housing against interfering influences, such as for example changing lighting conditions.

A frame for a checkweigher is known from DE 103 57 982 A1, with a longitudinal part of the frame extending in the longitudinal direction and intended as a carrying element. The latter can be designed rigid and torsion-proof in such a way that the stability required for the given case of application is achieved. Fitted at both ends of the longitudinal are part flat, plate-like transverse parts, which serve to support the frame on the floor. By designing the longitudinal part as a tube, the risk of contamination remaining on horizontal surface areas of the frame essentially no longer exists. In particular, no fluids remain, but rather run off to the floor. However, the longitudinal part gives rise to a large outlay on material, which also increases the total weight of the frame. In addition, a modular extension of the frame cannot be achieved without quite considerable expense.

Published application WO 2011/064088 A1 proposes a weighing-conveying arrangement, which comprises assembly elements made of plate-like material and transverse struts which connect the adjacent assembly elements, wherein the weighing-conveying arrangement is held on the assembly elements. The assembly elements each comprise a foot region, via which they are assembled on a base, and a holding region at which the weighing-conveying arrangement is held laterally. As a result of the lateral holding of the weighing-conveying arrangement, a moment is introduced into the assembly elements, which leads to a rotation around an axis running parallel in the conveying direction. During the infeed and outfeed of the products to be weighed or checked, the weighing-conveying arrangement can thus be caused to vibrate, which in turn creates poor conditions for the checkweigher used in the weighing-conveying arrangement.

Further frames known from the prior art represent expensive welded structures comprising metal struts extending in the longitudinal direction and transversely thereto. They are in need of improvement with regard to the stability required for the prevention of vibration. Furthermore, they are susceptible to soiling and difficult to clean. These frames likewise cannot be upgraded or extended in an easy manner.

The problem underlying the invention is to provide a frame of the type mentioned at the outset, which requires a reduced structural outlay and at the same time exhibits a high degree of stability, is less susceptible to soiling and easy to clean. The invention is also intended to provide a frame on which the fixing of components and additional equipment can be carried out in a straightforward and rapid manner.

In addition, it should be possible to assemble the frame in a modular design, i.e. the frame should be able to be adapted specifically to the place of operation and to the components to be carried with standardised individual components and/or groups of parts.

SUMMARY

The problems are solved according to the invention with the features according to the appended claims.

The frame for a conveyor belt system, which comprises a conveyor belt circulating in a longitudinal direction, for supporting a conveyor belt system on the ground assembled for operation, comprises at least two carrier elements made of a plate-like material, the principal planes whereof extend at right angles to the longitudinal direction, wherein one carrier element comprises a seating area disposed at the upper end. Furthermore, the frame comprises at least two distance elements, which are each disposed parallel to the longitudinal direction, determine a spacing of the at least two carrier elements and are each connected via at least one support element to at least one machine foot facing the ground, via which machine foot the frame is supported on the ground.

According to the invention, the frame additionally comprises at least two first mechanical interface elements, which run parallel to the distance elements, preferably extend over at least two carrier elements and are fixed lying on the seating areas of the at least two carrier elements, wherein the seating area is largely aligned horizontally. In addition, the frame comprises at least two fixing elements, by means of which the first mechanical interface elements can be fixed to the seating areas.

As a result of the way in which the frame according to the invention is constructed, the latter can be adapted to the installation situation with regard to the conveying length to be bridged, and also to the operator requirements in terms of width and installation height of the conveyor belt. The width and installation height are determined by the at least two carrier elements and the distance elements are duly adapted in order to adapt the frame to the conveying length. This modular design permits a greatly reduced parts range and a shorter assembly time with at the same time a high degree of flexibility in terms of the installation and operator requirements. Thanks to the modular design, subsequent adaptations of the system due to changed customer requirements are also possible and easier to implement.

The effect of the embodiment of the carrier elements made of a plate-like material is that the proportion of horizontal surfaces on which dirt and cleaning water could accumulate is reduced to a minimum. The frame is thus also suitable for use in hygiene and/or food areas.

The longitudinal direction of the frame is defined as the direction in which the conveyor belt circulates around the conveyor belt system on the transport side. In terms of definition, the longitudinal direction is equated with the conveying direction of the conveyor belt system. Above and below relate to a conveyor belt system assembled for operation and front is the region of the frame where an object passes onto the conveyor belt of the conveyor belt system. Accordingly, rear is where the object leaves the conveyor belt.

The principal plane of the carrier elements is the plane whose surface normal runs parallel to the longitudinal direction.

Such a frame is used for example in systems for product examinations. The invention is suitable both for accommodating a conveyor belt system alone and also in combination with an inspection system, as well as with additional components belonging to the system, such as for example light barriers, lateral guides for the goods to be transported, (code) reading devices, lightweight rejection devices (blowing nozzles) or suchlike.

A development of the invention makes provision such that, by means of further carrier elements and distance elements, the frame can be extended in and against its longitudinal direction. If the bridgeable conveying length is too long, so that the stability can no longer be guaranteed with long connection elements, an additional carrier element with support elements can further improve the stability.

Another development of the invention makes provision such that at least two carrier elements comprise in the lower region an attachment with a flat surface, on which a control cabinet can be supported.

An advantageous development of the invention makes provision such that it is possible to adapt the spacing from carrier element to carrier element flexibly to the installation conditions prevailing for the frame by using distance elements of differing length between two carrier elements in each case. It is also possible to adapt the width and height of the frame flexibly to the width of the conveyor belt system and its installation height by adapting the dimensions of the carrier elements in the directions of the principal plane. For the size adaptation of the frame to the place of installation, therefore, adaptations thus have to be made only to two components, to the carrier element and to the distance element, of the entire frame. The modular design thus created reduces the range of components and therefore also lowers the production costs.

An embodiment of the invention makes provision such that the at least two first mechanical interface elements run without interruption over the entire length of the frame. This further increases the stability in respect of bending and torsion in the longitudinal direction.

A further embodiment of the invention makes provision such that the frame also comprises at least one second mechanical interface element, which runs parallel to the first mechanical interface elements and is disposed above spaced apart from the seating area of the carrier elements. The effect of this embodiment is that built-on components on the frame are not only visually separated, but are also mutually protected against vibrations. A second mechanical interface element can be disposed either in the longitudinal direction to the left or to the right, or on both sides of the conveyor system, depending on where additional equipment for the conveyor belt system is to be fitted.

Another advantageous development of the invention makes provision such that the fixing elements fix, apart from the first mechanical interface elements to the seating areas of the carrier elements, also the second mechanical interface elements at a distance from the seating area of the carrier elements. Two tasks are thus performed by one component and the frame in turn comprises fewer components.

An advantageous embodiment of the invention makes provision such that the second mechanical interface element runs without interruption over the entire length of the frame. Once again, this additionally increases the stability with regard to bending and torsion in the longitudinal direction.

A further advantageous development of the invention makes provision such that the at least two first mechanical interface elements and the least one second mechanical interface element are configured as round profiles. Round surfaces have the advantage that, after cleaning of the frame, the water on these surfaces does not remain but rather runs off. The frame can thus also be used for an application in hygiene and food areas.

A further embodiment of the invention makes provision such that a conveyor belt system and/or a metal detection system for detecting metal impurities in a product conveyed on the conveyor belt and/or a checkweigher for weighing a product conveyed on the conveyor belt and/or an optical inspection system for detecting a defective appearance of a product conveyed on the conveyor belt can be provided on the at least two first mechanical interface elements.

Furthermore, the additional equipment of the conveyor belt system can be provided on the at least one second mechanical interface element. Additional equipment can for example be light barriers, lateral guides for the conveyed goods, reading devices, lightweight rejection devices (blowing nozzles) or other equipment.

A preferred embodiment of the invention is characterised in that the frame additionally comprises a connection element, which lies fixedly on the seating areas of two carrier elements and connects the two carrier elements in such a way that a checkweigher can be fixed thereto. An alternative form of fixing of a checkweigher to the frame is fixing to a connection element. The connection element connects two carrier elements, preferably orientated in the longitudinal direction and centrally with respect to the two first mechanical interface elements.

A further embodiment of the invention makes provision such that a frame for the checkweigher not connected to the frame for the conveyor belt system can be disposed in the free space between the carrier elements. The effect of separating the checkweigher and the conveyor belt including its components is to prevent vibrations from being conveyed via the frame to the checkweigher and the weighing performance of the checkweigher from being diminished with regard to precision and reproducibility.

A further embodiment of the invention makes provision such that the seating area of the carrier element is constituted by a profile rod connected to the plate-like material. This offers simplified production or it is possible to work with narrower production tolerances, as a result of which the precision in respect of the positions and spacings of the seating areas can be increased.

The frame according to the invention is preferably used for supporting a conveyor belt system with a checkweigher for weighing a product conveyed on the conveyor belt system and/or with a metal detection system for detecting metal impurities in a product conveyed on the conveyor belt and/or with an optical inspection system for detecting a defective appearance of a product conveyed on the conveyor belt and/or with an inspection system or suchlike on the supporting surface.

BRIEF DESCRIPTION OF THE DRAWINGS

The subject-matter of the invention is explained below with the aid of preferred examples of embodiment which are represented in the appended drawings. In the figures.

DETAILED DESCRIPTION

Features with the same function and a similar embodiment are provided with the same reference numbers in the following description.

Figure 1:
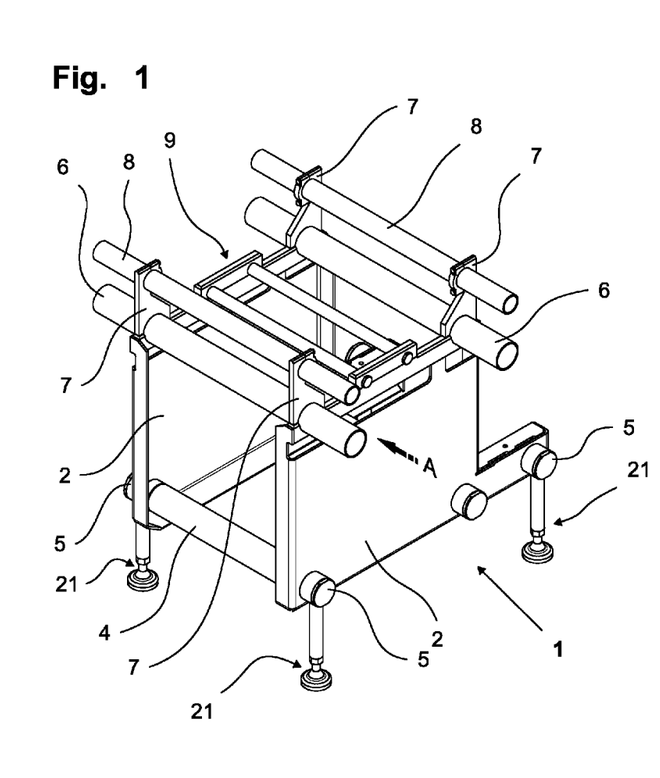
FIG. 1 shows an assembled basic module of the frame without components, in an isometric representation.

FIG. 1 shows an assembled basic module of frame 1, but still without built-on components. Two carrier elements 2 are held apart by two distance elements 4. Carrier elements 2 are held on distance elements 4 by terminal elements 5 and frame 1 for a conveyor belt system assembled for operation is supported on the ground by means of machine feet 21 fitted to support elements 5. At the upper end of carrier elements 2, two first mechanical interface elements 6 are each placed on seating area 3 of carrier element 2. Seating area 3 can comprise specially pre-formed seating points specially for the elements to be placed on (see FIGS. 2 and 3), for example semicircle-size cutouts for receiving a first mechanical interface element 6 as a tubular profile. A fixing element 7 in the form of a bracket fixes first mechanical interface element 6 to carrier element 2 and also increases the overall rigidity of frame 1. Components of the conveyor belt system, such as for example conveyor belts, checkweighers, metal detection systems and/or rejection devices, e.g. compressed air cylinders, can be fixed to this first mechanical interface element 6. Disposed above and spaced apart from seating area 3 are two mechanical interface elements 8, which run parallel to first mechanical interface element 6. Additional equipment such as for example light barriers, lateral guides for the conveyed product, reading devices, lightweight rejection devices (e.g.

blowing nozzles, etc) and so forth can be fitted to these two mechanical interface elements 6.

Figure 2:
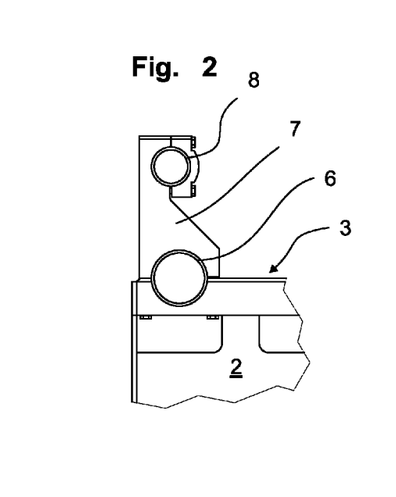
FIG. 2 shows a magnified representation of a side view of a fixing element in FIG. 1 from viewing direction A.

A special fixing element 7 is represented magnified in FIG. 2 as a side view from viewing angle A shown in FIG. 1. Fixing element 7 performs here several functions at the same time. On the one hand, it fixes first mechanical interface element 6 to carrier element 2, and on the other hand fixing element 7 spaces apart second mechanical interface element 8 on seating area 3 of carrier element 2 and at the same time fixes the latter. Frame 1 can of course also comprise fixing elements, by means of which only first mechanical interface elements 6 are fixed to seating areas 3. Such a simplified embodiment is not shown in FIG. 1. In such cases, with the presence of two interface elements, additional spacers different from fixing elements 7 would be required for the spacing of second mechanical interfaces 6 from seating area 3.

Figure 3:
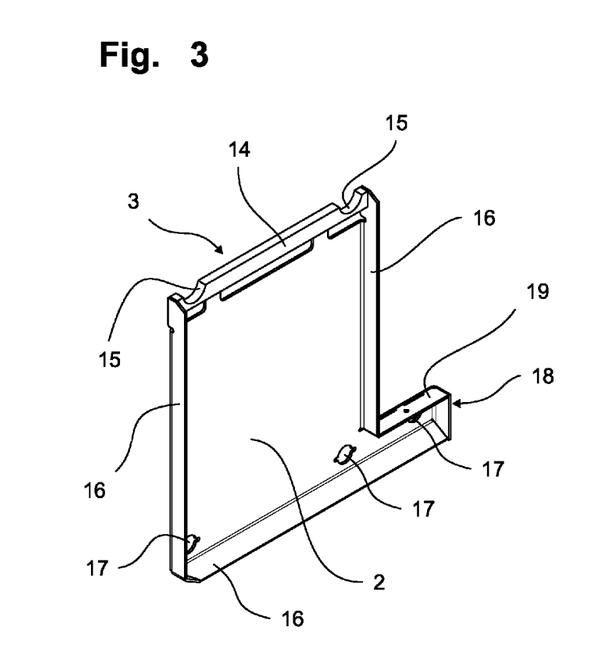
FIG. 3 shows an individual carrier element in an isometric representation with an attachment for supporting a control cabinet.
Figure 4:
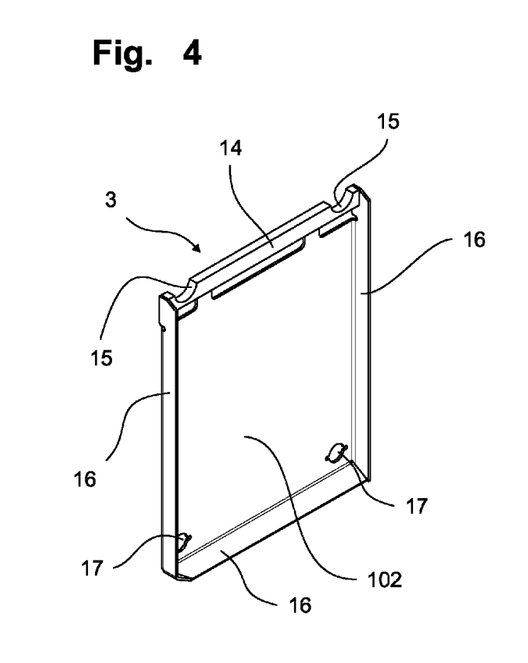
FIG. 4 shows an individual carrier element in an isometric representation without an attachment.

FIGS. 3 and 4 illustrate individual carrier elements 2, 102 as they are when ready for assembly. Carrier elements 2, 102 are produced from a plate-like material by cutting-out, bending and welding. In order to increase the rigidity of an individual carrier element 2, 102, the plate-like material comprises bending lugs 16 on the contours. Located at the upper end are seating areas 3 with in each case two seating points 15, which are constituted on a welded-in profile bar 14 in both FIGS. 3 and 4. Profile bar 14 on the one hand increases the stability of a carrier element 2, 102, and on the other hand the manufacturing precision can thus be increased with regard to the positions and spacings of seating points 15. Circular cutouts 17 are present at the lower end. The latter serve to connect a plurality of carrier elements 2, 102 by means of distance elements 4 and support elements 5, not shown in FIGS. 3 and 4. Carrier element 2 in FIG. 3 comprises at the lower end an attachment 18 with a flat surface 19, on which for example a control cabinet 20 can be supported, see FIGS. 5 to 7. At least two carrier elements 2 with an attachment 18 are preferably constituted in each case on a frame 1. Attachment 18 is usually not present on additional built-on carrier elements 102, see FIG. 4, and accordingly only two circular cutouts 17 are provided per carrier element 102.

By adapting the dimensions of carrier elements 2, 102 in the two directions of the principal plane, the width and the height of frame 1 assembled for operation can be adapted flexibly to the width of the conveyor belt system and its installation height. For a wider conveyor belt 10, the distance between seating points 15 of first mechanical interface elements 6 is increased in the direction at right angles to longitudinal direction L of the conveyor belt system and, for a conveyor belt system positioned at a higher level, the distance between the lower end of carrier element 2, 102 and seating areas 3 is increased. By adapting the length of distance elements 4, the length of frame 1 can also be adapted flexibly to the length of the conveyor belt system.

In order to comply with all the installation requirements, only distance element 4 and carrier element 2, 102 have to be selected with the correspondingly correct dimensions on the frame 1 according to the invention. As a result of this modularity, simplified production and stock-keeping results for the manufacturer of frame 1 and leads to lower production costs.

Figure 5:
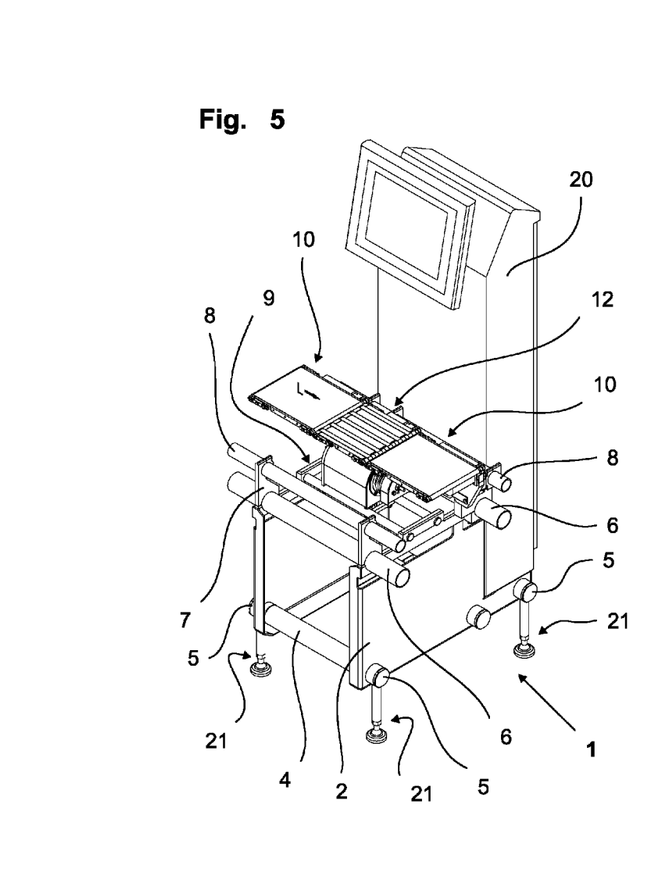
FIG. 5 shows an assembled basic module of the frame with a checkweigher and a control cabinet in an isometric representation.

FIG. 5 shows a possible use of frame 1 for a conveyor belt system with a checkweigher 12. The latter is supported on a connection element 9, which in turn rests on seating areas 3 of the two carrier elements 2. Two conveyor belts 10 are disposed close to the ends of the weighing belt of checkweigher 12 on the one hand as an infeed belt and on the other hand as an outfeed belt. As a result of the embodiment of first mechanical interfaces 6, of second mechanical interfaces 8 and of connection element 9 as a circular profile in longitudinal direction L, it is ensured that components of the conveyor belt system fitted to frame 1 can be displaced or adjusted relative to frame 1. A control cabinet 20 is supported via aforementioned attachments 18 on carrier elements 2. As a result of this assembly of control cabinet 29 on frame 1, the rear wall of control cabinet 20 remains accessible over its full extent. This makes it easier for the manufacturer of a checkweigher 12 to gain better access to respective control cabinet 20 and to the electrical components installed therein to remove malfunctions.

Figure 6:
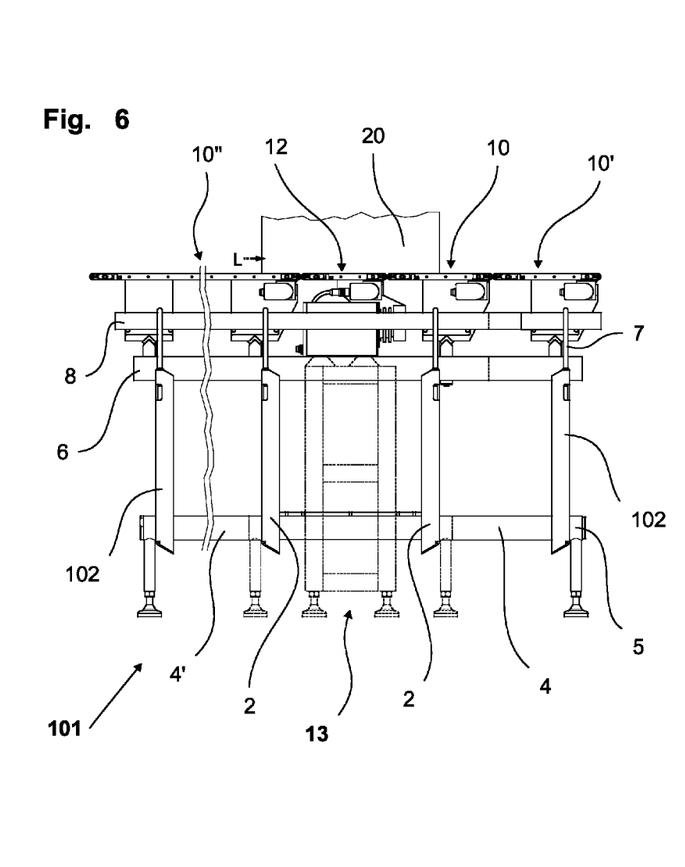
FIG. 6 shows an assembled basic module of the frame with a checkweigher, in a lateral representation as viewed by the operator.

FIG. 6 shows a front view of a further embodiment of the conveyor system with checkweigher 12 as viewed by an operator. A separate checkweigher frame 13 beneath checkweigher 12 is indicated by dashed lines. This variant of the fixing and support of a checkweigher 12 separated from frame 1 offers the advantage that vibrations and/or oscillations are not propagated up to the weighing cell of checkweigher 12 and do not therefore diminish the weighing performance of checkweigher 12 in respect of precision and reproducibility. The checkweigher is therefore supported completely isolated on the floor without contact points with frame 1 of the conveying systems and their components, since checkweigher frame 13 is not disposed connected to the frame for the conveyor belt system.

At the right-hand side in FIG. 6, the conveyor belt system, as is shown for example in FIG. 5, is extended by a further conveyor belt 10'. For this purpose, original frame 1 has been supplemented by an additional carrier element 102, and has been connected via a distance element 4 to the basic module of frame 1, wherein support element 5 and machine feet 21 have been displaced from right-hand carrier element 2 of the basic module to additional carrier element 102. First mechanical interface elements 6 and second mechanical interface elements 8 have been extended beyond seating points 5 of seating area 3 of carrier element 102 and fixed by a fixing element 7.

The conveyor belt system has also been extended in FIG. 6 on the left-hand side. However, the original conveyor belt used as an infeed belt of checkweigher 12 is replaced here by a longer conveyor belt 10", which now performs the task of feeding the objects onto checkweigher 12. The tear-line is intended to show that conveyor belt 10" could be of arbitrary length and frame 101 can therefore also be extended to a suitable support point. Here too, a carrier element 102 is connected via a distance element 4' to the basic module of frame 1 and accordingly first mechanical interface elements 6 and second mechanical interface elements 8 are extended beyond seating points 5 of seating area 3 of carrier element 102, and support element 5 and machine feet 21 have been displaced from left-hand carrier element 2 of the basic module to additional carrier element 102.

In the two extensions of the conveyor belt system described above, support elements 5 and machine feet 21 have each been displaced from their respective carrier element 2 of the basic module to additional carrier element 102. Frame 101 thus acquires a larger floor area and a free space beneath checkweigher 12. It is however also possible to leave support elements 5 and machine feet 21 on their respective carrier element 2 of the basic module, as a result of which the free space would arise beneath the extended conveyor belt system. Since distance element 4 can be fitted on both sides to support element 5, it is also possible to leave support elements 5 and machine feet 21 on their respective carrier element 2 of the basic module and to fit new support elements 5 and machine feet 21 to additional carrier elements 102, as a result of which frame 101 is finally supported by more machine feet 21 on the supporting surface than before the extension of the conveyor belt system.

Figure 7:
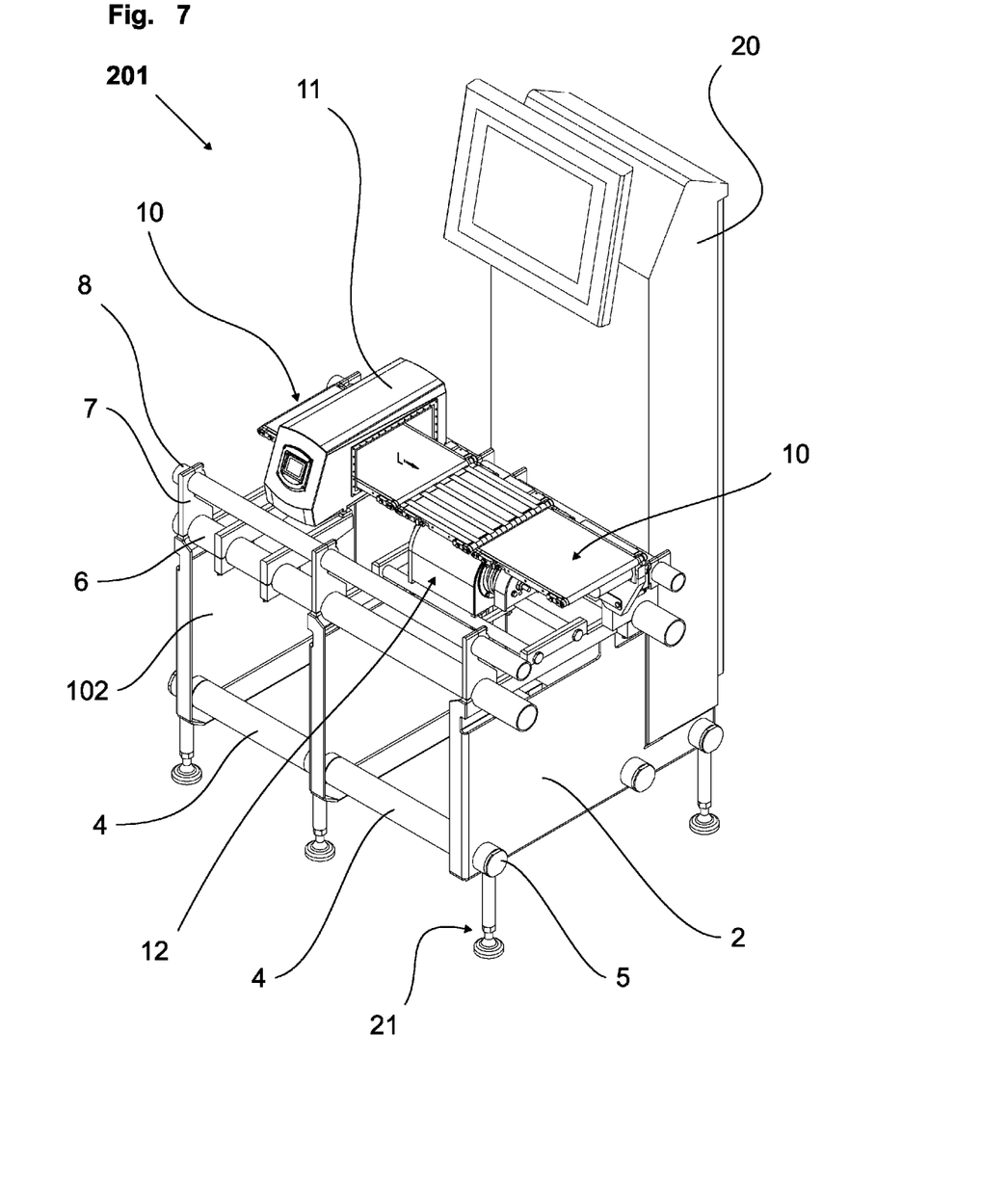
FIG. 7 shows an assembled basic module of the frame with a checkweigher and a metal detection system located upstream of the checkweigher in the longitudinal direction, in an isometric representation.

FIG. 7 shows a conveyor belt system with a metal detection system 11 and a checkweigher 12 following in longitudinal direction L in an isometric representation. Checkweigher 12, which weighs the objects on the conveyor belt system, and metal detection system 11, which examines objects for product impurities, are used in the same production line. It is often recommended to dispose a plurality of inspection systems directly one after the other in the same production line in order to make joint use of a rejection device that normally follows and rejects defective products. As represented in FIG. 7, a metal detection system 11 can be disposed upstream of checkweigher 12 as a result of the extendibility of frame 1. In this case, the infeed belt of checkweigher 12 conveys the objects in running direction L first through metal detection system 11 and then onto the weighing belt of checkweigher 12. The arrangement of metal detection system 11 after checkweigher 12 would also be possible, as would the replacement of both by another inspection system.

It is usual to provide a rejection device following metal detection system 12 and checkweigher 12, said rejection device then separating out defective products.

Although the invention has been described by the presentation of a number of specific examples of embodiment, it is obvious that numerous further variants of embodiment can be created in the knowledge of the present invention, for example by combining the features of the individual examples of embodiment with one another and/or by interchanging individual functional units of the examples of embodiment

What is claimed is:

1. A frame for supporting, on the ground, a conveyor belt system that is assembled for operation, the conveyor belt system having a conveyor belt that circulates in a longitudinal direction, the frame comprising:
   at least two carrier elements, each carrier element made from plate-like material, such that each carrier element has principal planes that extend at right angles to the longitudinal direction;
   at least two distance elements, disposed parallel to the longitudinal direction, to determine a spacing of the at least two carrier elements;
   at least one machine foot, facing the ground, that supports the frame on the ground;
   at least one support element that connects each of the distance elements to the at least one machine foot;
   at least two first mechanical interface elements, which run parallel to the distance elements;
   a seating area, disposed at an upper end of each of the carrier elements and aligned largely in a horizontal direction; and
   for each seating area, at least two fixing elements, by which the first mechanical interface elements are fixed to the seating area.

2. The frame of claim 1, further comprising:
   additional carrier elements and distance elements, such that the frame is extended in and against the longitudinal direction.

3. The frame of claim 1, wherein:
   two of the at least two carrier elements, in a lower region thereof, have a flat surface for supporting an attachment of a control cabinet thereto.

4. The frame of claim 2, wherein:
   the spacing between two of the at least two carrier elements is adapted to the installation conditions by varying the length of the distance elements disposed between the respective carrier elements.

5. The frame of claim 1, wherein:
   the frame has a width and a height that is adapted to the installation conditions by only adapting the dimensions of the carrier elements in the directions of the principal plane.

6. The frame of claim 1, wherein:
   the at least two first mechanical interface elements run without interruption over the entire length of the frame.

7. The frame of claim 1, further comprising:
   at least one second mechanical interface element, which runs parallel to the at least two first mechanical interface elements and is disposed above and spaced apart from the seating area.

8. The frame of claim 7, wherein:
   the fixing elements fix the second mechanical interface elements at a distance from the seating area.

9. The frame of claim 7, wherein:
   each of the second mechanical interface elements runs without interruption over the entire length of the frame.

10. The frame of claim 7, wherein:
    each of the at least two first mechanical interface elements and each of the at least one second mechanical interface elements has a circular cross-sectional profile.

11. The frame of claim 1, wherein:
    in addition to the conveyor belt system, the at least two first mechanical interface elements are sized and adapted to support at least one of: a metal detection system for detecting metal impurities in a product conveyed on the conveyor belt system; a checkweigher for weighing the product; and an optical inspection system for detecting a defective appearance of the product.

12. The frame of claim 1, further comprising:
    a connection element, fixedly arranged on the seating area of each of the two carrier elements to connect the two carrier elements for fixing a checkweigher thereto.

13. The frame of claim 1, further comprising:
    a further frame, adapted to receive a checkweigher that is not connected to the frame, is disposed in a free space between the carrier elements.

14. The frame of claim 1, wherein:
    a profile rod connected to the plate-like material defines the seating area of the carrier element.

15. The frame of claim 1, wherein:
    the first mechanical interface elements extend over the at least two carrier elements.

16. A conveyor belt system, comprising:
    a conveyor belt;
    a checkweigher for weighing a product conveyed on the conveyor belt; and
    a frame, according to claim 1, on which the conveyor belt and the checkweigher are supported.

17. The conveyor belt system of claim 16, further comprising at least one of:
    a metal detection system, supported on the frame, for detecting metal impurities in the product conveyed; and
    an optical inspection system, supported on the frame, for detecting a defective appearance of the product conveyed.

18. The frame of claim 5, wherein:
    a profile rod connected to the plate-like material defines the seating area of the carrier element.

19. The frame of claim 7, wherein:
a profile rod connected to the plate-like material defines the seating area of the carrier element.

\* \* \* \* \*